Oct. 1, 1957  E. J. OSTERHUS ET AL  2,807,963
MULTIPLE SPEED TRANSMISSION
Filed March 31, 1954  4 Sheets-Sheet 1

INVENTORS
ERVIN J. OSTERHUS
WILLIAM C. ALBERTSON JR
BY
ATTORNEY

Oct. 1, 1957  E. J. OSTERHUS ET AL  2,807,963
MULTIPLE SPEED TRANSMISSION

Filed March 31, 1954  4 Sheets-Sheet 3

INVENTORS.
ERVIN J. OSTERHUS
WILLIAM C. ALBERTSON JR
BY
ATTORNEY

Oct. 1, 1957   E. J. OSTERHUS ET AL   2,807,963
MULTIPLE SPEED TRANSMISSION
Filed March 31, 1954                              4 Sheets-Sheet 4

INVENTORS.
ERVIN J. OSTERHUS
WILLIAM C. ALBERTSON JR.
BY
ATTORNEY

United States Patent Office 2,807,963
Patented Oct. 1, 1957

2,807,963

MULTIPLE SPEED TRANSMISSION

Ervin J. Osterhus, Seven Hills Village, and William C. Albertson, Jr., Lakewood, Ohio, assignors to Westinghouse Electric Corporation, East Pittsburgh, Pa., a corporation of Pennsylvania Application March 31, 1954, Serial No. 419,946

2 Claims. (Cl. 74—217)

This invention relates to a two-speed mechanism for a machine operable at one speed for washing fabrics and for subsequently centrifuging washing fluid from the fabrics at a higher speed. An object of the invention is to provide an improved mechanism of the type set forth.

The invention, while of general application, is particularly applicable to domestic type machines which employ a single-speed motor for driving the clothes basket at low and high speeds for respectively washing fabrics and centrifuging water therefrom. In accordance with the invention, low and high speed belted systems are selectively rendered active for driving the basket. The low speed system employs a pulley driven by the motor and belted to a large idler pulley having a small pulley fixed thereto and belted to a slow speed driving pulley mounted on the shaft of the basket for relative movement therewith. An overrunning clutch connects the slow speed driving pulley and the shaft during washing operations when the shaft is actuated at low washing speeds. The high speed belted system employs a clutch type pulley driven by the motor and belted to a high speed driving pulley for the basket and keyed or fixed to the shaft of the basket. During high speed operation, the aforementioned clutch permits overrunning of the shaft relative said slow speed driving pulley for the shaft. The clutch type pulley referred to is preferably actuated by a solenoid through a spring of preselected scale so that gradual predetermined acceleration of the high speed system is effected. Accordingly, it is an object of this invention to provide an improved transmission incorporating low and high speed belted systems selectively rendered active for the driving of the clothes basket of a washing and centrifuging machine, which transmission provides for a gradual predetermined rate of acceleration of the driven basket to its centrifuging speed and the uniform distribution of fabrics in the basket so necessary for maintaining vibration during high speed centrifuging operations at low amplitudes.

These and other objects are effected by the invention as will be apparent from the following description taken in connection with the accompanying drawings, forming a part of this application, in which.

Figure 1:
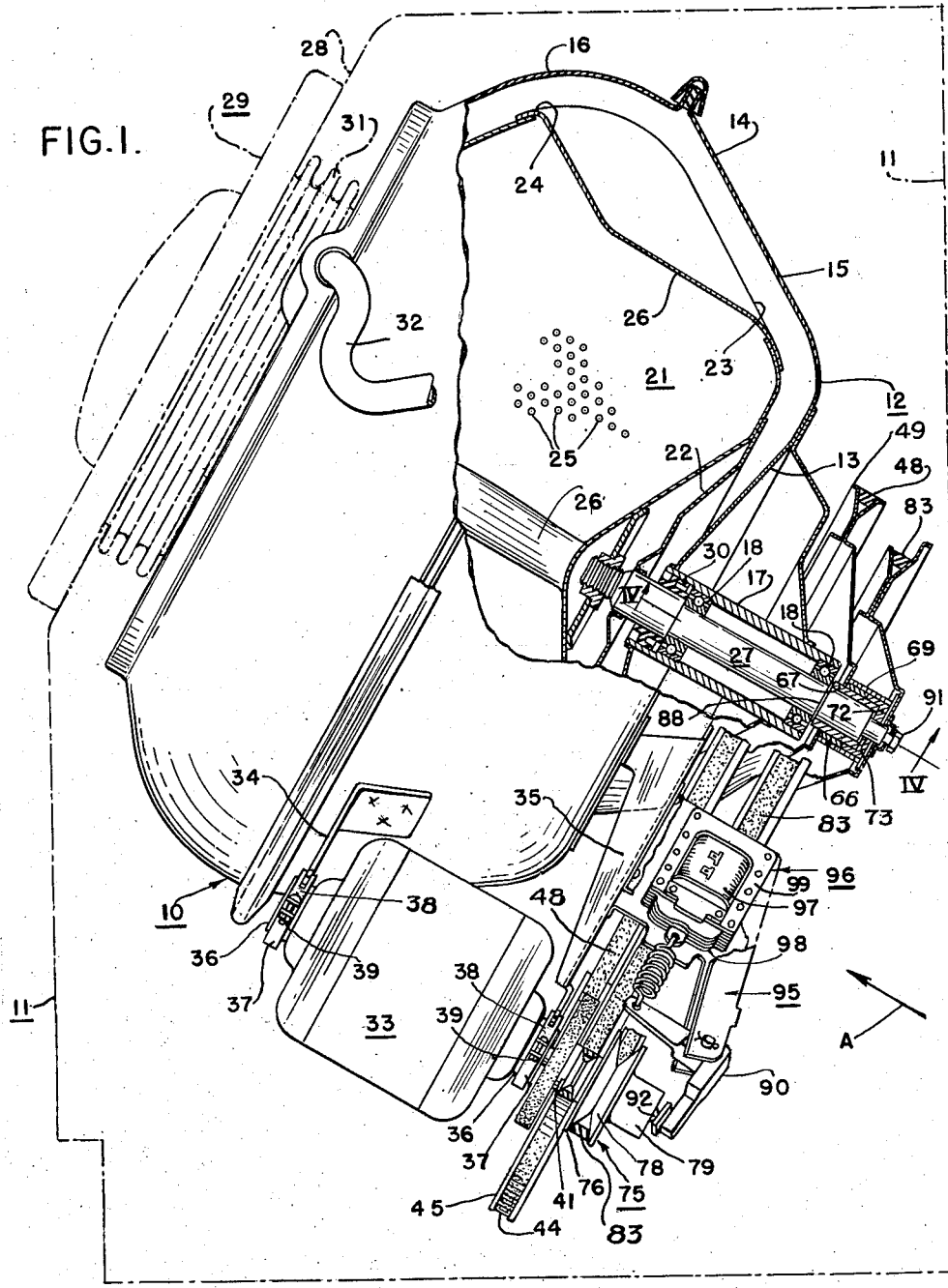
Fig. 1 is a side view with portions broken away of a clothes washing and centrifuging unit incorporating an improved two-speed transmission constructed and arranged in accordance with the invention.

Referring now to the drawings, the invention is disclosed applied to a domestic clothes washing and centrifuging machine of the type employing a clothes basket rotatable at low and high speeds about an oblique axis for the washing and centrifuging of the fabrics, respectively. This type of machine utilizes a washing and spinning unit generally indicated at 10 and housed within a casing 11 indicated by the broken lines in Fig. 1. The details of the casing and the mechanism for suspending the unit 10 therewithin have not been shown for the sake of brevity and since they form no part of the present invention. Usually, the unit 10 is resiliently suspended by a spring system which permits the unit 10 to vibrate without imparting the alternating forces to the casing 11. A suitable spring system is shown in the patent of Frank Breckenridge et al. No. 2,296,261, granted September 22, 1942.

The washing and centrifuging unit 10 includes a tub structure 12 having a rear wall 13 and a side wall 14. The latter includes a frusto-conical portion diverging forwardly from the rear wall, as shown at 15, and a rounded portion converging to the front end of the tub, as shown at 16. As shown, the axis of the tub is oblique, being arranged in the example disclosed approximately 30° above the horizontal. The rear wall 13 has a sleeve 17 secured thereto coaxially of the tub for the support of axially spaced bearings 18 to be referred to presently.

A basket for containing the fabrics to be treated is shown generally at 21 and is of substantially the same configuration as the tub in that it includes a relatively small rear wall 22 and a side wall which diverges forwardly as shown at 23. The basket also includes a rounded portion 24 which converges to the front end of the basket. The side wall portions 23 and 24 are perforate substantially throughout their extent, a number of the perforations being indicated at 25. The basket is also provided with a plurality of paddles or vanes 26 which extend radially inwardly from the side wall portions 23—24. As is well understood, the vanes 26 agitate the fabrics in a body of washing fluid contained within the basket during slow speed rotation thereof for removing soil from the fabrics.

The basket 21 is arranged coaxially within the tub 12 and the rear wall 22 may be reentrant as shown. A shaft 27 is secured to the basket within the reentrant end wall thereof in any suitable manner and defines the sole support for the basket. The shaft 27 is supported by the spaced bearings 18 for rotation at a relatively low speed of, for example 50 R. P. M., for cleaning the fabrics and at a relatively high speed of, for example 500 R. P. M., for centrifuging cleaning fluid from the fabrics. A suitable water seal 30 engaging the shaft 27 may be provided within the sleeve 17 for preventing the escape of water therethrough. The means for rotating the basket in the manner set forth will be described presently.

It will be understood that the front end of the tub 12 and the basket 21 have relatively large registering openings (not shown) for gaining access to the interior of the basket and also that the upper portion of the front wall of the housing 11 has a relatively large opening (not shown) aligned with the access openings of the tub and basket. The upper portion of the front wall of the housing 11 containing the access opening is arranged in a plane normal to the axis of the basket, as shown at 28. The access opening of the housing 28 is closed by a suitable door structure, indicated generally at 29, and hinged to the housing 11 in any suitable manner. In order to prevent spilling or splashing of water within the housing 11, a flexible wall structure, indicated at 31, connects the front wall 28 of the casing 11 to the front end of the tub 12 peripherally of the access openings therein. A detailed showing of the various access openings referred to as well as the construction of the flexible wall 31 is deemed unnecessary since they form no part of the present invention. A suitable arrangement of these access openings and the flexible wall is disclosed in the patent to E. O. Morton, No. 2,613,837, granted October 14, 1952.

The means for admitting washing and rinsing water to the tub and the discharge of vitiated water from the tub form no part of the present invention and have not been disclosed for the sake of brevity and clearness of illustration. Briefly, water at suitable temperature is conducted to the tub, usually through a flexible conduit and under control of a conventional valve. A portion of the flexible conduit just referred to is shown at 32. Vitiated water is discharged from the tub, usually by a motor-driven centrifugal pump, to a suitable drain.

Figure 3:
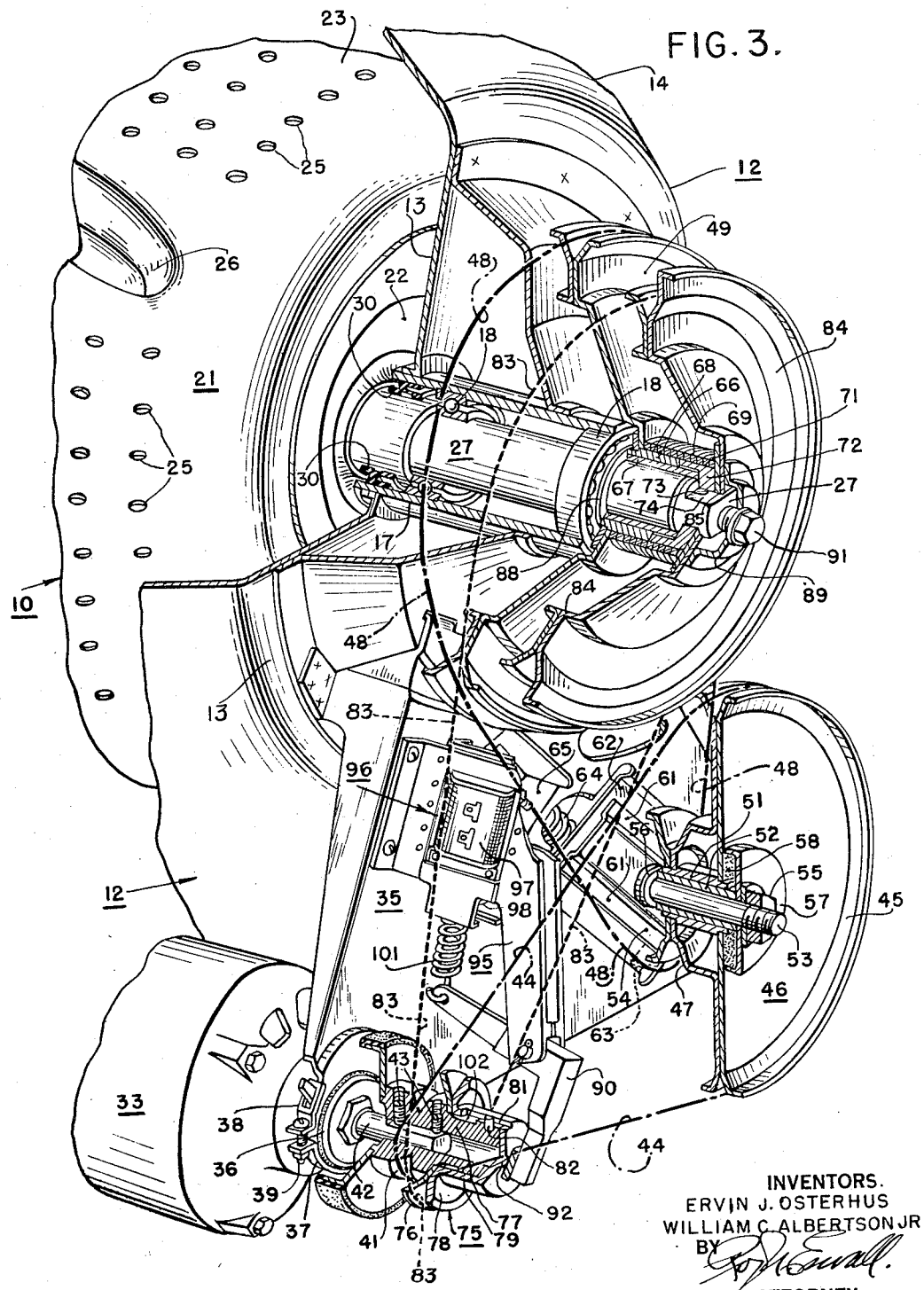
Fig. 3 is a perspective view of the rear portion of the washing and centrifuging unit with parts broken away for the sake of clearness.
Figure 4:
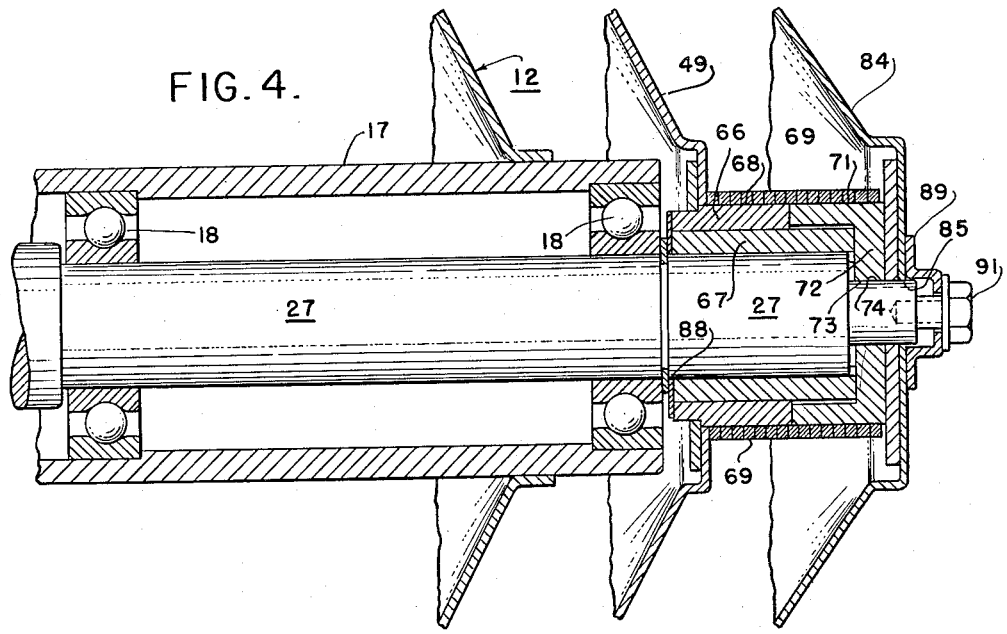
Fig. 4 is an enlarged sectional view of some details shown in Fig. 1 as viewed from the line IV—IV of Fig. 1.

The power for rotating the basket at its relatively low and high speeds is derived from a constant speed motor shown at 33 of the so-called washing machine type. Support for the motor is provided by a pair of brackets 34 and 35 which are spot welded or otherwise suitably secured to the tub 12. The motor 33 is conventional and is supported by a pair of axially aligned cylindrical bosses 36 arranged at each end of the motor. These bosses are seated within suitable arcuate seats formed in the ends of the brackets 34 and 35. Contractable clamps 37 are hooked or otherwise secured to the brackets, as best shown at 38 in Fig. 3, and are drawn into engagement with the bosses 36 by the tightening of a bolt 39. Accordingly, the bosses 36 are forced into engagement with the arcuate seats in the brackets 34 and 35 for the proper alignment of the motor 33, all of which is well understood.

In accordance with the invention, improved means are provided for transmitting power from the motor 33 to the basket shaft 27 and for providing the high and low speeds set forth heretofore. This power transmission includes relatively low and high speed belt and pulley systems which are selectively operated. The low speed pulley system includes a pulley 41 which is fixed to the shaft 42 of the motor 33 in any suitable manner, such as for example by set screws 43. This pulley drives a belt of the so-called V-type, indicated at 44 and driving a relatively large diameter pulley 45 which forms a part of an idler wheel generally indicated at 46. The idler wheel 46 also includes a relatively small diameter pulley 47 driving a belt 48 which is threaded over a pulley 49 to be referred to as the slow speed driving pulley for the basket.

The idler wheel 46 is provided with a hub 51 rotatably mounted on a bearing sleeve 52. The latter is hollow and fits over a supporting stud 53 suitably secured at one of its ends to an L-shaped floating plate 54. The opposite end of the stud 53 is threaded to receive a nut 55 which, when drawn tight, forces the bearing sleeve 52 against a shoulder 56 carried by the stud 53. Preferably a pan 57 containing an oil soaked wick 58 is carried by the stud 53 for lubricating the outer portion of the bearing sleeve 52, all of which is believed well understood.

Figure 5:
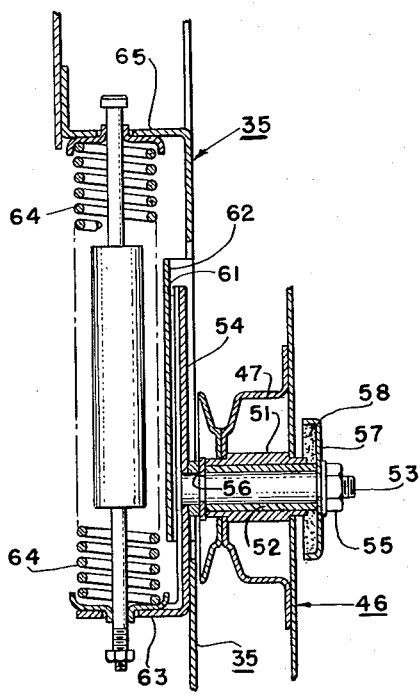
Fig. 5 is a sectional view of the idler pulley belt tightener and is taken on the line V—V of Fig. 2.

The floating plate 54 is slidable on one side of the supporting bracket 35 and has a pair of runners 61 slidable upon a pad 62, the latter being offset from the bracket 35, as best shown in Fig. 5. As shown, the pad 62 is integral with the bracket 35, being formed by embossing or pressing a portion of the bracket 35 to an offset position with respect to the main portion of the bracket 35. The floating plate 54 includes an end portion 63 which is normal to the main body of the plate 54. A compression spring 64 is positioned between a seat 65 formed on the bracket 35 and the end portion 63 of the floating plate 54 in order to bias the idler wheel 46 away from the shafts of the motor and the basket and thereby tension both belts 44 and 48. As one belt or the other wears, the plate 54 rocks to a new position under the influence of the compression spring 64 in order to maintain the tension on both belts 44 and 48 at the proper values.

As shown, the slow speed basket driving pulley 49 is provided with a hub 66 journaled on a bearing sleeve 67 for relative rotary movement with respect thereto. The outer surface of the hub 66 is cylindrical and defines a clutching surface 68 for a closely wound helical spring 69 having a drag fit on the clutching surface 68. The spring 69 also engages a clutching surface 71 formed on a clutch member 72, the latter being secured to the shaft 27 of the basket in any suitable manner. As shown, the clutching member 72 is provided with a non-circular opening 73 for receiving a non-circular projecting portion 74 of the shaft 27. The clutching surfaces 68 and 71 and the helical spring 69 define a one-way or overrunning clutch between the pulley 49 and the shaft 27. The spring 69 is wound in such direction that it tends to wind on the clutching surfaces 68 and 71 and tightly grips these surfaces when the drive is from the pulley 49 to the shaft 27. When the shaft 27 is rotated at a higher speed than the pulley 49, as explained hereinafter, the clutching surface 71, now being the driving surface, tends to unwind the spring 69 and expand the same. Accordingly, the clutching surface 71 and the shaft 27 are permitted to overrun with respect to the clutching surface 68 and the pulley 49.

The high speed belt and pulley system includes an expanding or clutching type pulley 75 having one flange 76 fixed in any suitable manner to a hub 77 forming a part of the pulley 41 and rotating at all times therewith. The pulley 75 also includes a flange 78 splined to the hub 77 so that it rotates at all times therewith and which may be moved axially with respect to the hub 77. As shown, the movable flange 78 includes an axial hub extension 79 slotted, as shown at 81, to receive a radial pin 82 carried by the hub 77. The pin 82 rotates the movable flange 78 but permits axial movement of the flange 78 toward and away from the flange 76. A belt 83 is threaded between the flanges 76 and 78 and over a high speed basket driving pulley 84. The latter is fixed to the shaft 27 of the basket 21 in any suitable manner. As shown, the pulley 84 is provided with a non-circular opening 85 which receives the non-circular projection 74 of the shaft 27. It will be noted that the high speed driving pulley 84, the clutching member 72 and the bearing sleeve 67 are maintained in proper axial position on the shaft 27 between a shoulder 88 carried by the shaft 27 and a cap 89, the latter being forced against the pulley 84 by a cap screw 91 threaded in the end of the shaft 27.

Figure 2:
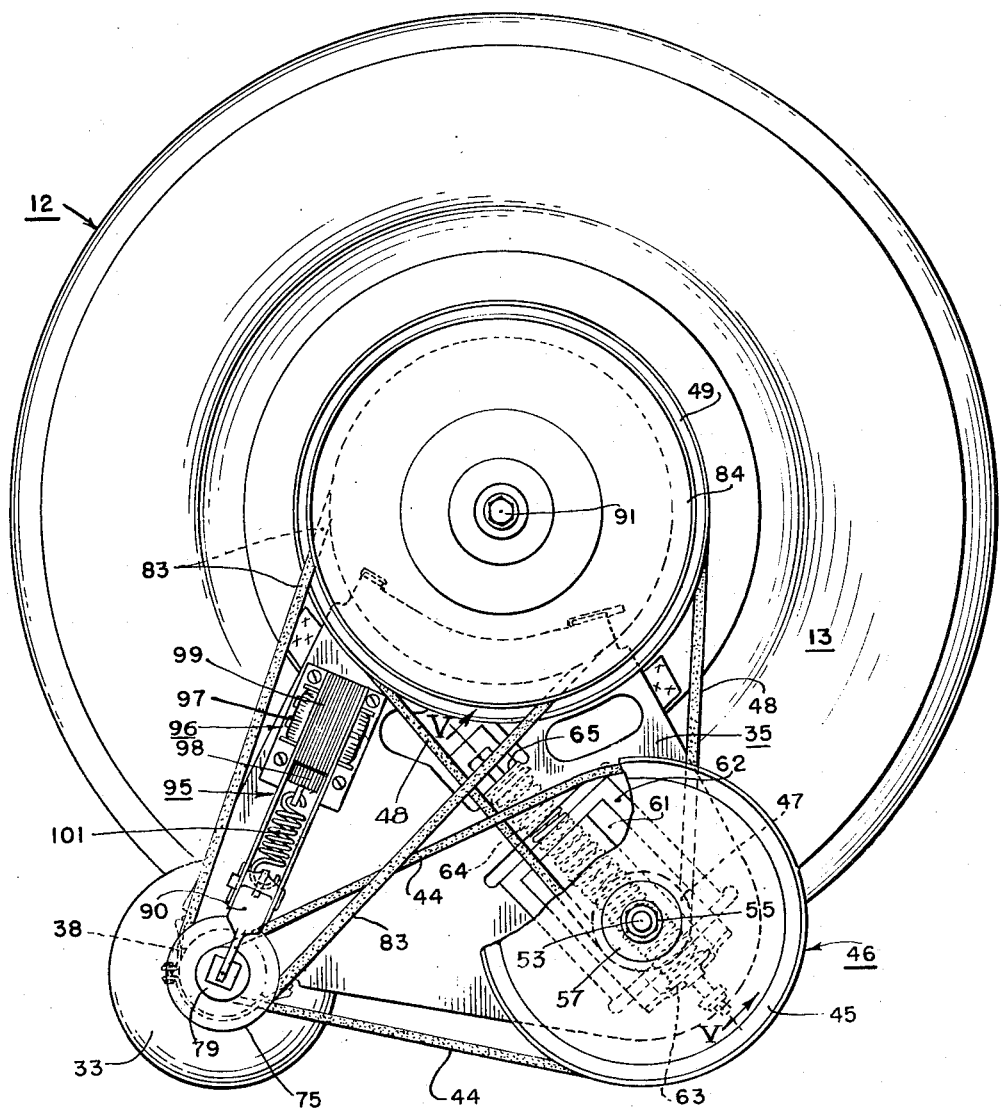
Fig. 2 is a rear view of the washing and centrifuging unit as viewed in the direction of the arrow A of Fig. 1.

Axial movement of the flange 78 is controlled by a bell crank 90, bearing at one of its ends on a center projection 92 formed on the hub extension 79. The bell crank 90 is pivoted to a frame 95 secured in any suitable manner to the motor support bracket 35 and defining a support for a magnet indicated at 96, generally. The magnet 96 is conventional and includes a coil 97, a movable armature 98 and a fixed core or field, preferably laminated, and indicated at 99 in Fig. 2. The core 99 is secured to the frame 95 and is magnetized highly upon energization of the coil 97 as is well understood. Accordingly, the armature 98 is magnetically attracted by the core 99 and rapidly moves toward and into engagement with the core 99. Deenergization of the coil 97 reduces materially the strength of the magnetic field so that the armature 98 may freely move away from the core 99. The armature 98 is connected to an end of the bell crank 90 for actuating the latter about its pivot and, following the invention, a tension spring 101 is interposed between the armature 98 and the bell crank 90. The purpose of the spring 101 is to limit to a predetermined value the axial thrust acting on the movable flange 78 when the magnet 96 is energized and also to permit immediate seating of the armature 98 relative the core 99.

The illustrated positions of the armature 98, the bell crank 90 and the adjustable pulley flange 78 are those effective during energized periods of the magnet 96, and therefore, during high speed operation of the basket. During low speed, washing operations, the armature 98 is in a lower position out of contact with the core 99 as the magnet 96 is deenergized. Accordingly, the spring 101 is contracted and the bell crank 90 is in a position counter-clockwise from that shown and the flange 78 is spaced from the flange 76 and out of driving engagement with the belt 83. At this time, the belt 83 rides loosely upon an annular face 102 formed on the hub 77 intermediate the flanges 76 and 78.

It is believed that the operation of the apparatus is understandable from the foregoing but it will be summarized here as follows. During washing operations, the apparatus is in the position set forth in the latter part of the preceding paragraph so that the basket is rotated by the slow speed belt and pulley system. At the conclusion of the washing operation and the subsequent draining of the washing water from the tub, the magnet 96 is energized. The armature 98 rapidly moves upward engaging the core 99 and expanding the spring 101. The latter imparts a predetermined axial force or thrust to the flange 78 through the bell crank 90. As the flange 78 moves axially, it engages the belt 83 and forces the latter toward the flange 76 and into driving engagement with both flanges 76 and 78. Due to the fact that the flanges 76 and 78 are flared outwardly and the belt 83 is of the so-called V type, the thrust imparted to the flange 78 tends to drive the belt outwardly. At first, the belt engages an inner portion of the flared flanges 76—78, or small pitch diameter thereof, providing a high ratio speed reduction with the pulley 84 which, of course, is desirable at this time as high torque is required at the motor shaft to accelerate the basket. The tendency for the belt 84 to run quickly to the larger diameter of the flanges 76—78 is retarded by the relatively high tension in the belt at this time. As the basket accelerates the torque requirements reduce and the tension in the belt 83 also progressively diminishes. The thrust provided by spring 101 is substantially constant so that the belt 83 gradually moves outwardly to the larger pitch diameter of the flanges 76—78 providing uniform steady acceleration of the basket and improved distribution of fabrics within the basket for the centrifuging period which follows. It will be understood that, as soon as the belt 83 becomes effective to drive the pulley 84 at a speed above 50 R. P. M. the clutch spring 69 is unwound and slips permitting overrunning of shaft 27 and clutch member 72 relative the slow speed pulley 49 and clutch member 66. Termination of the centrifuging period is effected by deenergizing the magnet 86, rendering the high speed pulley system once again inactive.

From the foregoing description, it will be apparent that an improved transmission for a washing and centrifuging machine is provided employing relatively low cost high and low speed belt and pulley systems selectively actuated by a simple control mechanism. The arrangement is such that uniform acceleration of the basket to its high speed is effected as well as uniform distribution of the fabrics within the basket. By uniformly accelerating the basket as set forth, the torque requirements of the motor are maintained at relatively low values.

While the invention has been shown in but one form, it will be obvious to those skilled in the art that it is not so limited, but is susceptible of various changes and modifications without departing from the spirit thereof.

What is claimed is:

1. A multiple-speed mechanism for a driven shaft and a motor having a shaft rotatable at substantially constant speed for driving said driven shaft, the combination of relatively low and higher speed belt and pulley systems connecting the motor shaft and the driven shaft; said low speed system including a pulley fixed to the motor shaft, an idler wheel belted to the motor driven pulley, a slow speed driving pulley carried by the driven shaft for relative rotary movement therewith, said slow speed driving pulley being belted to the idler wheel and driven thereby, an overrunning clutch structure driven by said slow speed driving pulley and driving the driven shaft, said higher speed belt and pulley system including a clutching type pulley, a high speed driving pulley fixed to the driven shaft, a high speed belt connecting the high speed driving pulley and said clutching pulley, said clutching pulley having one flange fixed to the motor shaft and a second flange splined to the motor shaft for rotation therewith and axial movement relative thereto, a solenoid having a movable core for actuating said second flange toward said one flange and into driving engagement with the high speed belt and a spring of predetermined scale transmitting movement of said core to the second flange and limiting to a predetermined value the force engaging the second flange and the high speed belt.

2. In a multiple speed transmission for a driven shaft and a motor having a substantially constant speed shaft for driving the driven shaft, the combination of first and second pulley systems driven by the motor and selectively operated for rotating the driven shaft at low and high speeds, respectively, said first system including a driving pulley fixed to the motor shaft, relatively large and small idler pulleys, a slow speed driving pulley journalled on the driven shaft for relative movement therewith, a belt driven by said driving pulley on the motor shaft and driving said large idler pulley, a second belt driven by the small idler pulley and driving said slow speed driving pulley, a jack shaft rotatably supporting the idler pulleys, means varying the position of the jack shaft relative the shaft of the motor and said driven shaft for adjusting the tension in said first and second belts and an overrunning clutch interposed between said slow speed driving pulley and the driven shaft; said second pulley system including an adjustable clutching pulley carried by the motor shaft, a high speed driving pulley fixed to the driven shaft and a high speed belt connecting the clutching pulley and said high speed driving pulley, said clutching pulley including a flange fixed to the shaft of the motor, a second flange splined to the shaft of the motor for rotation therewith and movement axially thereof toward and away from the fixed flange, said high speed belt being disposed between said flanges of the clutching pulley, a member for moving said second flange into driving engagement with the high speed belt, a solenoid for actuating the member and a spring interposed between the solenoid and said member for limiting the force engaging said second flange and the high speed belt.

References Cited in the file of this patent

UNITED STATES PATENTS

| | | |
|---|---|---|
| 2,112,430 | Tholl | Mar. 29, 1938 |
| 2,337,586 | Bowen | Dec. 28, 1943 |
| 2,343,742 | Breckenridge | Mar. 7, 1944 |
| 2,463,100 | Gredell | Mar. 1, 1949 |
| 2,512,263 | Archbold | June 20, 1950 |
| 2,538,667 | Chamberlin | Jan. 16, 1951 |
| 2,648,213 | Castner | Aug. 11, 1953 |